UNITED STATES PATENT OFFICE.

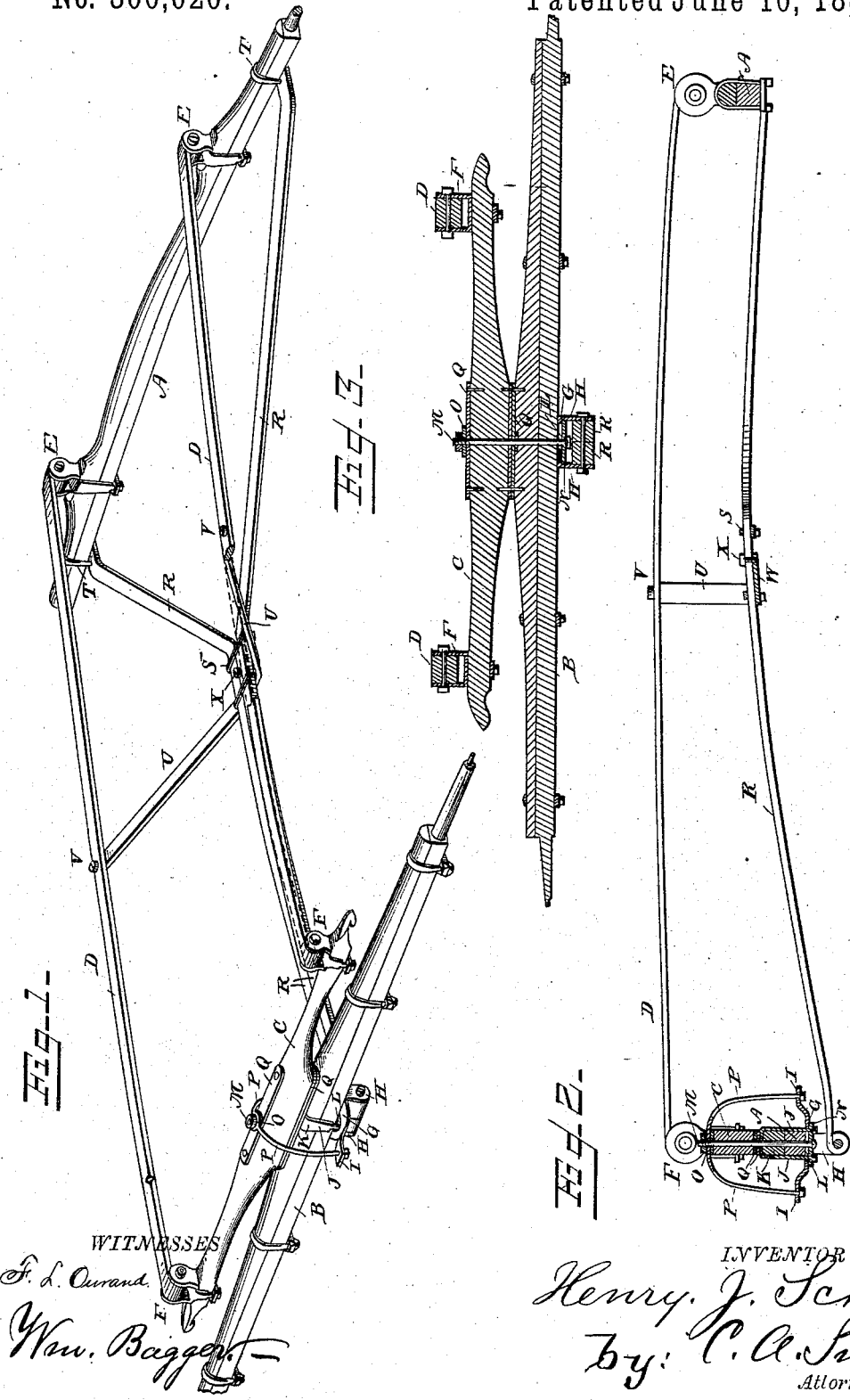

HENRY J. SCHILD, OF STANTON, MICHIGAN.

VEHICLE-SPRING.

SPECIFICATION forming part of Letters Patent No. 300,020, dated June 10, 1884.

Application filed November 6, 1883. (No model.)

*To all whom it may concern:*

Be it known that I, HENRY J. SCHILD, a citizen of the United States, residing at Stanton, in the county of Montcalm and State of Michigan, have invented a new and useful Vehicle-Spring, of which the following is a specification, reference being had to the accompanying drawings.

This invention relates to vehicle-springs; and it has for its object to produce a side-spring gear for buggies and the like which shall possess superior advantages in point of simplicity, durability, and general efficiency.

To this end the invention consists in the improved construction and arrangement of parts, which will be hereinafter fully described, and particularly pointed out in the claim.

In the drawings hereto annexed, Figure 1 is a perspective view of my improved vehicle-spring. Fig. 2 is a longitudinal sectional view. Fig. 3 is a transverse vertical sectional view taken through the front axle.

The same letters refer to the same parts in all the figures.

In the drawings, A designates the rear axle, B the front axle, and C the bolster resting upon the latter, as will be presently more fully described.

D D are a pair of parallel side springs, the rear ends of which are hinged to clips E upon the rear axle, and the front ends of which are hinged in like manner to clips F upon the front bolster, near the ends of the same.

G is a clip or plate arranged centrally under the front axle, and having downward-projecting arms H H and forward and rearward projecting arms I I. Through the said plate G pass the arms J of a clip, K, encircling the front axle and axle-tree, an opening, L, being provided for the accommodation of said arms, of sufficient size to allow the arms to turn within the same when the front axle turns. The king-bolt M passes through a plate or washer, N, secured upon the arms J J, in an upward direction, through the axle, axle-tree, and bolster, and has secured upon its upper end a clip, O, having flaring or curved arms P P, the lower ends of which are nutted to the arms I I of the plate G. Wear-plates or washers Q Q are interposed between the axle-tree and bolster, as shown.

The perch or reach is constructed of a pair of spring-bars, R R, hinged between the arms H H of the plate G under the front axle, and extending rearward side by side for about two-thirds the length of the running-gear. At this point they are connected by means of a clip, S, directly in rear of which they diverge to the ends of the rear axle, where they are firmly secured by means of clips T.

U is a transverse brace clipped to the reach in front of the clip S, and having its ends extended upwardly to the side springs, D D, to which they are bolted at V V. The central portion of the brace U is supported by a plate, W, secured to the under side of the perch by means of a screw or bolt, X.

From the foregoing description, taken in connection with the drawings hereto annexed, the operation and advantages of this invention will be readily understood. It is simple and inexpensive, and by it a strong, durable, and in every respect efficient running-gear for buggies and other light vehicles is produced.

I claim as my invention and desire to secure by Letters Patent of the United States—

As an improvement in running-gear for vehicles, the perch or reach comprising two flat springs, R, secured side by side and extending rearwardly for about two-thirds of their length, an encircling-clip, S, securing them together at this point, then diverging immediately in rear of said clip to near the outer ends of the rear axle, to the under face of which they are secured, in combination with the axle and bolster, the side springs connecting the rear axle and bolster, the double-inclined brace U, secured at its center to the reach and at its ends to the side springs, and a plate, G, secured to the front axle, and having downwardly-extending arms H, between which the leaves of the perch or reach are secured, as set forth.

In testimony that I claim the foregoing as my own I have hereto affixed my signature in presence of two witnesses.

HENRY J. SCHILD.

Witnesses:
 FRANK A. MÜLLER,
 GEO. S. STEERE.